US012762218B2

(12) United States Patent
Mehta

(10) Patent No.: US 12,762,218 B2
(45) Date of Patent: Oct. 13, 2026

(54) BIOMETRIC-SECURED MULTIPORT ADAPTER

(71) Applicant: Dell Products L.P., Round Rock, TX (US)

(72) Inventor: Siddhant Mehta, Ujjain (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/672,902

(22) Filed: May 23, 2024

(65) Prior Publication Data

US 2025/0363194 A1 Nov. 27, 2025

(51) Int. Cl.
*G06F 21/32* (2013.01)
*G06F 21/85* (2013.01)

(52) U.S. Cl.
CPC .............. *G06F 21/32* (2013.01); *G06F 21/85* (2013.01)

(58) Field of Classification Search
None
See application file for complete search history.

(56) References Cited

U.S. PATENT DOCUMENTS

2003/0005337 A1* 1/2003 Poo ....................... H04L 9/3231 726/5
2005/0097338 A1* 5/2005 Lee ........................ G06V 40/13 713/186
2007/0132733 A1* 6/2007 Ram ................... G06F 3/03544 345/163
2008/0005415 A1* 1/2008 Lopez ................... G06F 13/385 710/62
2013/0067534 A1* 3/2013 Soffer ................... G06F 3/0227 726/34
2018/0101678 A1* 4/2018 Rosa ..................... G06F 3/0622
2018/0225230 A1* 8/2018 Litichever ............... G06F 21/56
2019/0341711 A1* 11/2019 Justin ..................... H02G 11/02

FOREIGN PATENT DOCUMENTS

CN 203102298 U * 7/2013
CN 117744065 A * 3/2024

OTHER PUBLICATIONS

Definition of Around by Merriam-Webster (Year: 2024).*
Necker, "Do any secure USB hubs exist", Qubes OS Forum (Year: 2021).*
Dell Technologies, "Dell 7-In-1 USB-C Multiport Adapter—DA310, Extensive Connectivity, Compact Design," version 2, Apr. 2022, 2 pages.

* cited by examiner

*Primary Examiner* — Boris D Grijalva Lobos
(74) *Attorney, Agent, or Firm* — Fogarty LLP

(57) ABSTRACT

A multiport adapter is disclosed. The multiport adapter includes an integrated circuit having a plurality of contact pins. A plurality of ports are mounted around a periphery of the multiport adapter. Each of the plurality of ports are coupled to data pins on the integrated circuit. Each of the plurality of ports are further coupled to an on/off pin assigned to the port. A cable having a connector on a first end is configured to attach to a port on an information handling system. The cable has a second end that is electrically connected to selected contact pins on the integrated circuit via the integrated circuit. A light is coupled to a light pin on the integrated circuit. A fingerprint sensor is coupled to biometric sensor pins on the integrated circuit.

16 Claims, 7 Drawing Sheets

BIOMETRIC-SECURED MULTIPORT ADAPTER

BACKGROUND

As the value and use of information continues to increase, individuals and businesses seek additional ways to process and store information. One option available to users is Information Handling Systems (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

A multiport adapter is disclosed. The multiport adapter includes an integrated circuit having a plurality of contact pins. A plurality of ports are mounted around a periphery of the multiport adapter. Each of the plurality of ports are coupled to data pins on the integrated circuit. Each of the plurality of ports are further coupled to an on/off pin assigned to the port. A cable having a connector on a first end is configured to attach to a port on an information handling system. The cable has a second end that is electrically connected to selected contact pins on the integrated circuit via the integrated circuit. A light is coupled to a light pin on the integrated circuit. A fingerprint sensor is coupled to biometric sensor pins on the integrated circuit.

The invention will make laptops, desktops, servers, and switches more secure from Man-in-the-Middle attacks from port based hacking devices (such as LAN turtle, bash bunny, poison tap, USB armory, Pwn Plug etc.), as this mechanism will block all the ports of the connector at the hardware level for malicious users and at the same time allow a genuine user to use the ports just like plug-and-play. This extra level of security will safeguard our customers against malicious port-based physical attacks.

BRIEF DESCRIPTION OF THE DRAWINGS

Figure 1A:
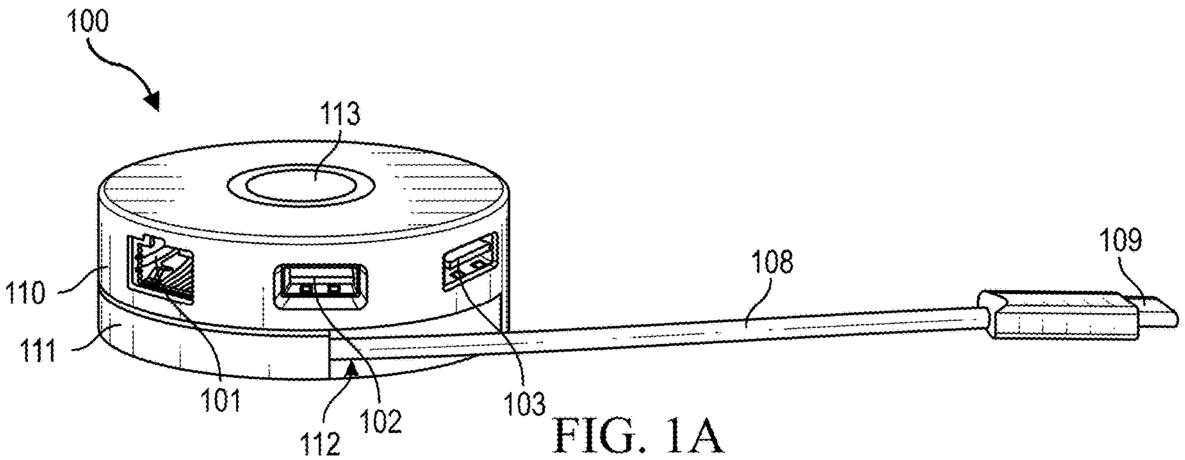
Figure 1B:
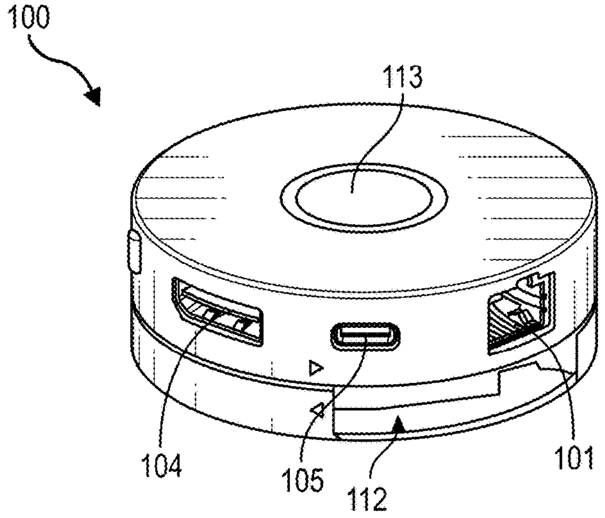
Figure 1C:
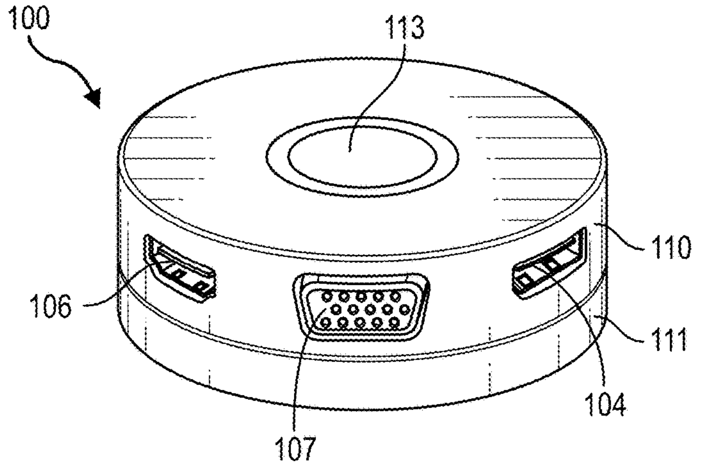

Having thus described the invention in general terms, reference will now be made to the accompanying drawings, which are not necessarily drawn to scale, and wherein:

FIGS. 1A-C illustrate different views of a multiport adapter that provides video, network, data connectivity, and power pass-through for a laptop, desktop, or other device.

Figure 2:
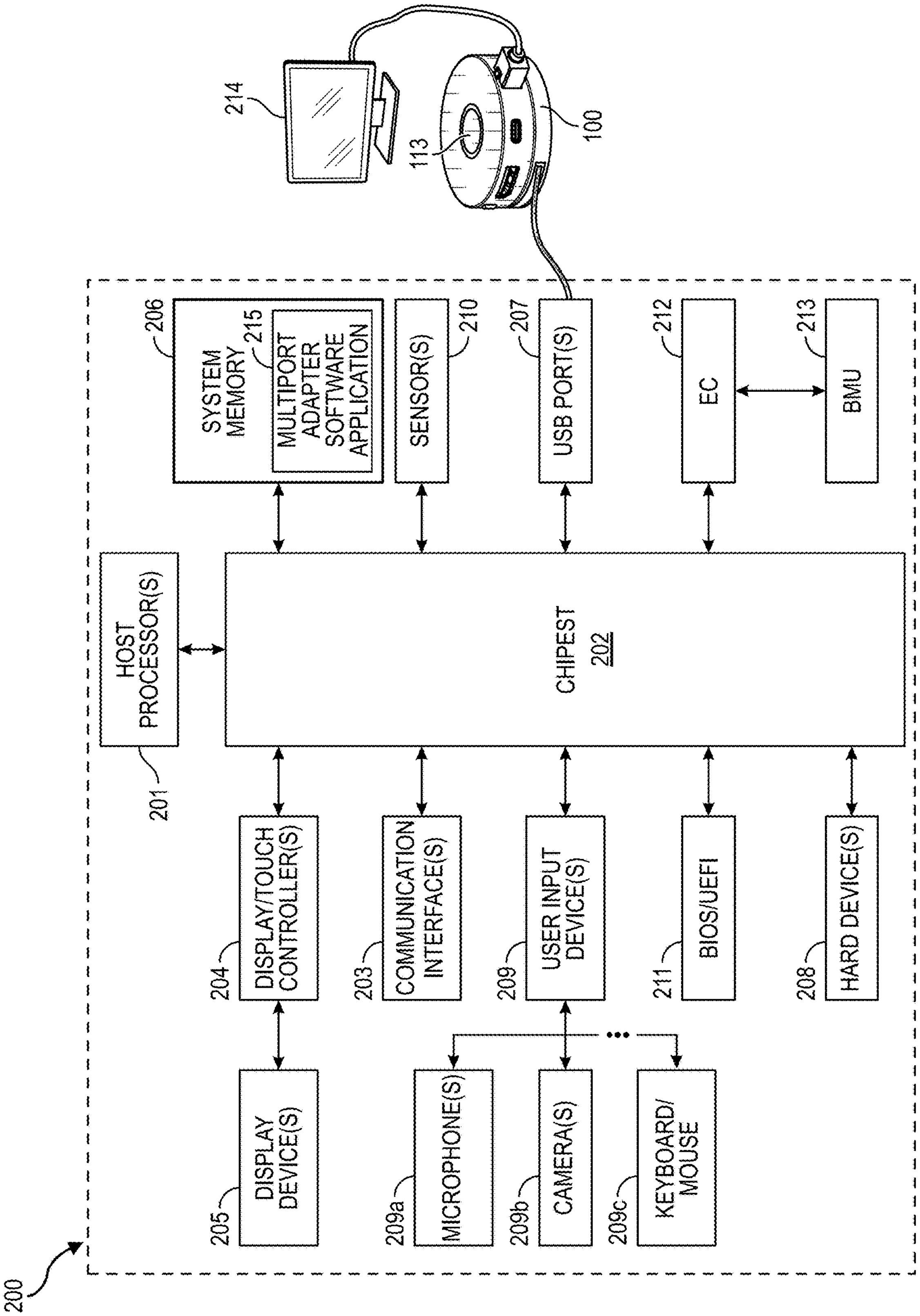

FIG. 2 is a block diagram illustrating an IHS coupled to a peripheral device using a multiport adapter.

Figure 3:
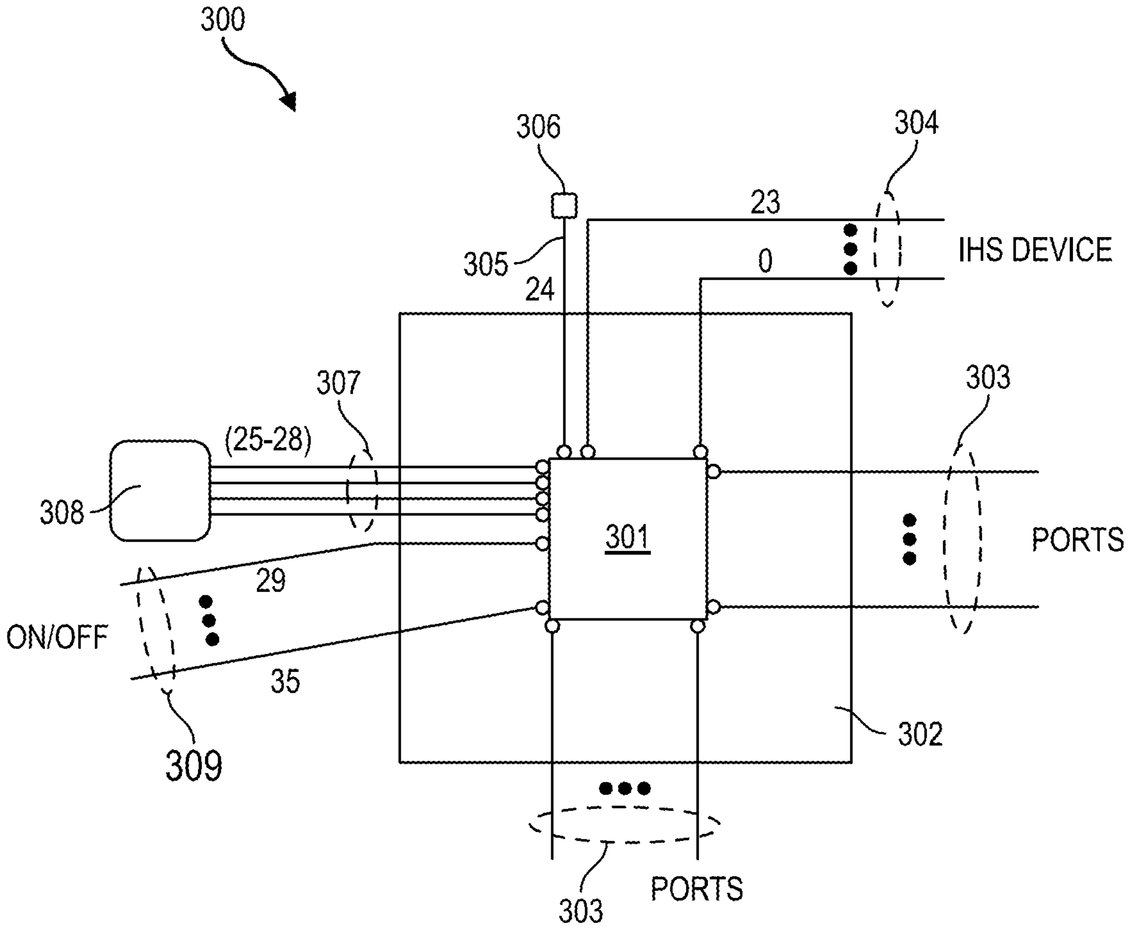

FIG. 3 is a circuit diagram for a multiport adapter according to example embodiments.

Figure 4:
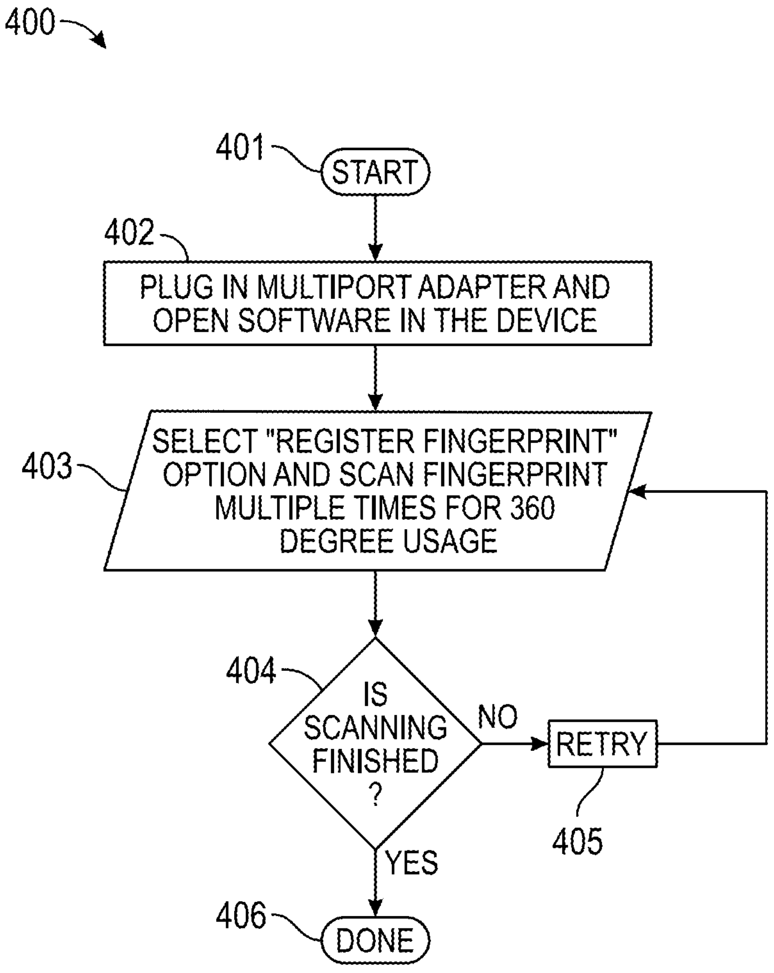

FIG. 4 is a flowchart illustrating a process for registration of a fingerprint for use with a multiport adaptor having secure-port features.

Figure 5:
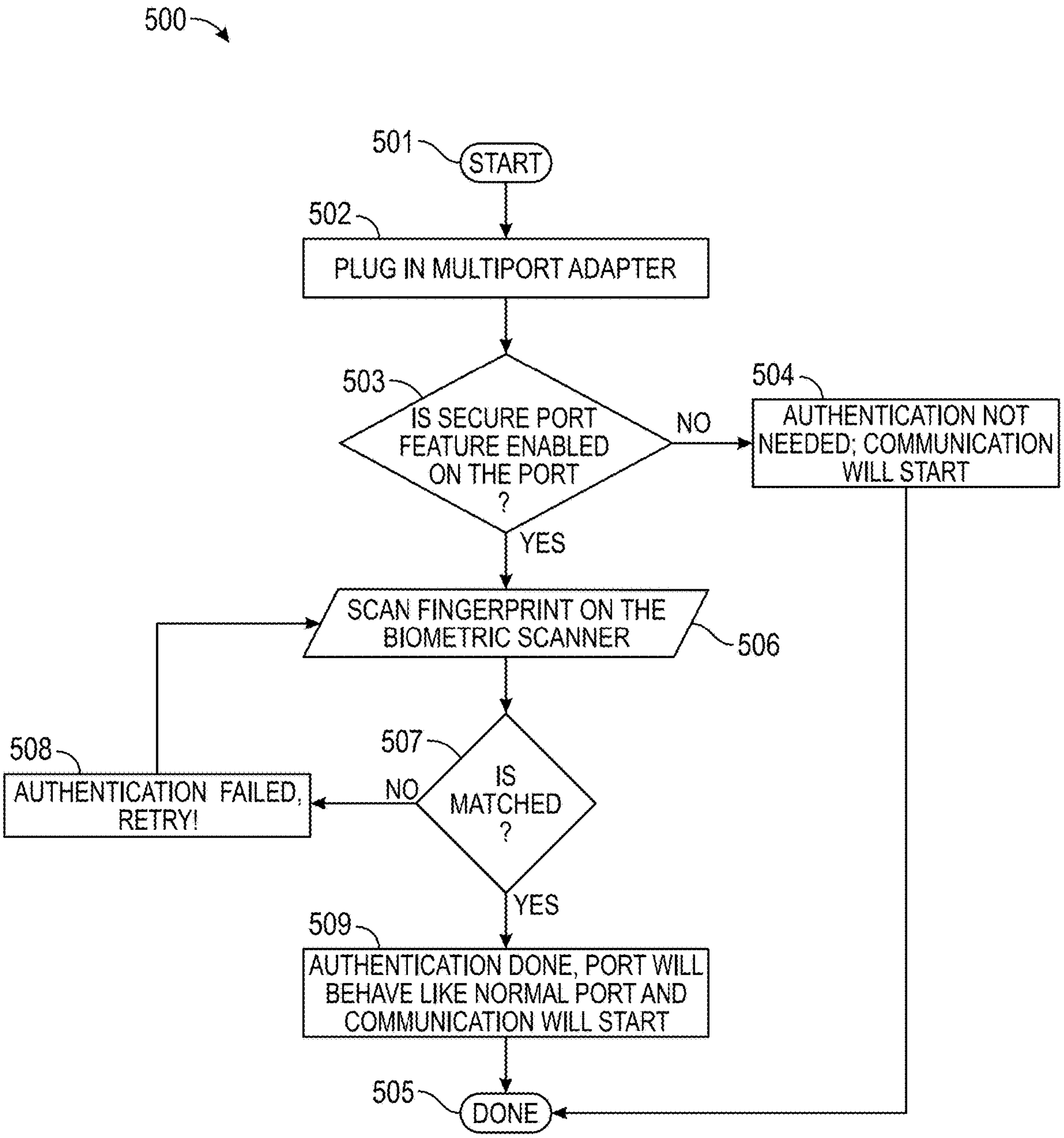

FIG. 5 is a flowchart illustrating a process for use of a multiport adaptor having secure-port features.

Figure 6:
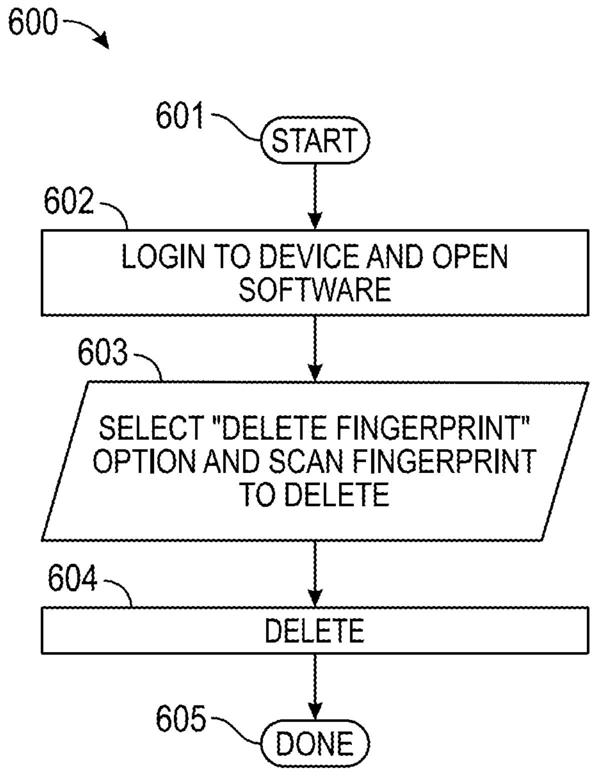

FIG. 6 is a flowchart illustrating a process for removing fingerprints stored for a multiport adaptor having secure-port features.

Figure 7:
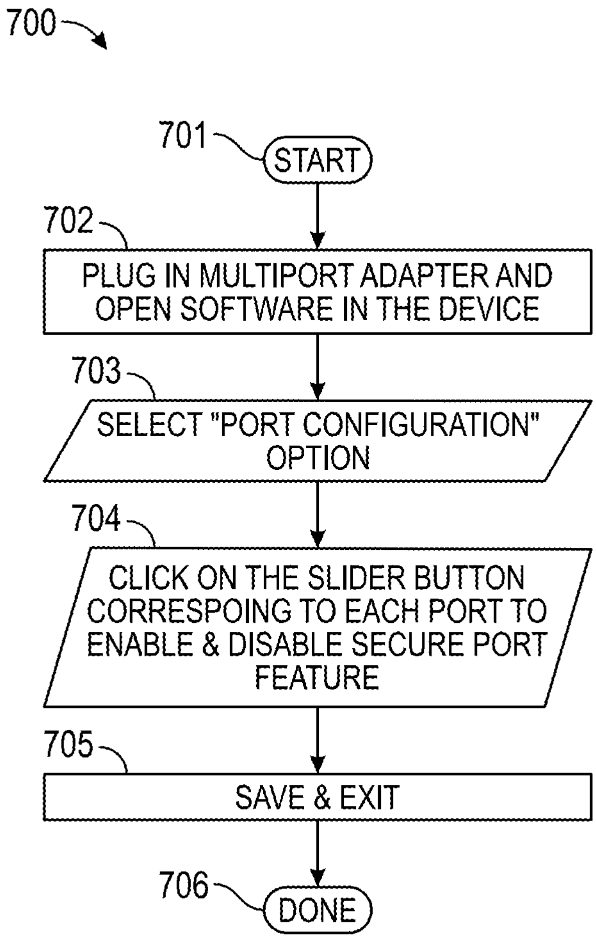

FIG. 7 is a flowchart illustrating a process for enabling or disabling ports on a multiport adaptor having secure-port features.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIGS. 1A-C illustrate different views of a multiport adapter 100 that provides video, network, and data connectivity and power pass-through for a laptop, desktop, or other device. Multiport adapter 100 as illustrated has seven ports, including an RJ-45 port 101, two Universal Serial Bus-A (USB-A) ports 102, 103, a DisplayPort 104, a USB-C port 105, an HDMI port 106, and a VGA port 107. The multiport adapter 100 has a cable 108 with a connector 109 that is adapted to connect to a laptop or similar device. In one embodiment, connector 109 is a USB-C adapter that is configured to engage a USB-C port on a laptop or similar device. Once multiport adapter 100 is connected via cable 108 and connector 109, a laptop or similar device may then be connected to various peripheral devices, such as monitors, projectors, headsets, keyboard, mouse, flash drives, and other accessories, or to wired networks, such as a Local Area Network (LAN).

The multiport adapter 100 has a top portion 110 and a bottom portion 111. The bottom portion 111 may be hollow or otherwise have open space 112 within the bottom portion. The top portion 110 and bottom 111 are configured to rotate relative to each other. Cable 108 may be a coaxial cable that is attached to bottom portion 111. Cable 108 may be extended or retracted relative to multiport adapter 100 by rotating the top and bottom cover of the adapter. When retracted, the cable 108 is concealed within space 112 of the bottom portion 111. In other embodiments, cable 108 may be mounted on a spring-loaded reel that retracts cable 108 into space 112 when the adapter 100 is not in use.

In an example configuration, the USB-C port 105 may support power pass through, video, and data. USB-C port 105 may provide up to 4K resolution at 30 Hz to a monitor. USB-A ports 102, 103 and USB-C port 105 provide data transfers up to 10 Gbps. In one embodiment, only one video output is available at a time from DisplayPort 104, HDMI port 106, or VGA port 107.

While seven ports are shown in the example embodiment illustrated in FIGS. 1A-C, it will be understood that in other configuration any other number or type of ports may be available on multiport adapter 100 as appropriate for peripheral availability and user need. For example, in other configurations, only HDMI port 106 might be included and the space used by DisplayPort 104 and VGA port 107 may be used instead by additional USB ports, such as mini-or micro-USB ports, Apple Lightning ports, etc. Additionally, in other embodiments, the shape and configuration of the multiport adapter 100 may be cylindrical (i.e., having a circular cross section) as illustrated in FIGS. 1A-C or may be any other appropriate shape, such having a square, hexagon, or octagon cross section shape.

The ports on existing multiport adapters are always open and operate in a plug-in-play mode. This allow hackers to connect a physical hacking device, such as a LAN Turtle, Bash Bunny, PoisonTap, or Pwn Plug, to the multiport adapter. Once connected to the multiport adapter, such devices can easily run Man-In-The-Middle attacks to intercept and compromise the device. Existing multiport adapters have no mechanism by which USB/LAN/HDMI port on the device can be blocked. The existing multiport adapters are simple connectors at the hardware level and are simply plug-and-play devices. Moreover, if the ports on existing multiport adapters are blocked, then it will be difficult for a user to interact with an attached device, such as a laptop, desktop, or server.

A biometric fingerprint scanner 113 is used on multiport adapter 100 to make the various ports (e.g., USB 102, 103, 105, LAN 101, HDMI 106) more secure. The fingerprint scanner 113 is user friendly and adds a security layer to existing plug-and-play features thereby making the ports more secure from malicious user attacks.

FIG. 2 is a block diagram illustrating an IHS 200 coupled to a peripheral device 214 using a multiport adapter 100. As depicted, IHS 200 includes host processor(s) 201. In various embodiments, IHS 200 may be a single-processor system, or a multi-processor system including two or more processors. Host processor(s) 201 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201. Chipset 202 may also be coupled to communication interface(s) 203 to enable communications between IHS 200 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like.

Communication interface(s) 203 may be used to communicate with peripheral devices (e.g., BT speakers, microphones, headsets, etc.). Moreover, communication interface (s) 203 may be coupled to chipset 202 via a Peripheral Component Interconnect Express (PCIe) bus, or the like.

Chipset 202 may be coupled to display and/or touchscreen controller(s) 204, which may include one or more Graphics Processor Units (GPUs) on a graphics bus, such as an Accelerated Graphics Port (AGP) or PCIe bus. As shown, display controller(s) 204 provide video or display signals to one or more display device(s) 205.

Display device(s) 205 may include Liquid Crystal Display (LCD), Light Emitting Diode (LED), organic LED (OLED), or other thin film display technologies. Display device(s) 205 may include a plurality of pixels arranged in a matrix, configured to display visual information, such as text, two-dimensional images, video, three-dimensional images, etc. In some cases, display device(s) 205 may be provided as a single continuous display, rather than two discrete displays.

Chipset 202 may provide host processor(s) 201 and/or display controller(s) 204 with access to system memory 206. In various embodiments, system memory 206 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 202 may also provide host processor(s) 201 with access to one or more USB ports/controllers 207, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 208.

Chipset 202 may also provide access to one or more user input devices 209, for example, using a super I/O controller or the like. Examples of user input devices 209 include, but are not limited to, microphone(s) 209*a*, camera(s) 209*b*, and keyboard/mouse 209*c*. Other user input devices 209 may include a touchpad, stylus or active pen, totem, etc. Each user input device 209 may include a respective controller (e.g., a touchpad may have its own touchpad controller) that interfaces with chipset 202 through a wired or wireless connection (e.g., via communication interfaces(s) 203).

In some cases, chipset 202 may also provide access to one or more user output devices (e.g., video projectors, paper printers, 3D printers, loudspeakers, audio headsets, Virtual/Augmented Reality (VR/AR) devices, etc.).

In certain embodiments, chipset 202 may further provide an interface for communications with one or more hardware sensors 210. Sensors 210 may be disposed on or within the chassis of IHS 200, or otherwise coupled to IHS 200, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

BIOS/UEFI 211 is coupled to chipset 202. UEFI was designed as a successor to BIOS, and many modern IHSs utilize UEFI in addition to or instead of a BIOS. Accordingly, BIOS/UEFI 211 is intended to also encompass a UEFI component. BIOS/UEFI 211 provides an abstraction layer that allows the OS to interface with certain hardware components that are utilized by IHS 200.

Upon booting of IHS 200, host processor(s) 201 may utilize program instructions of BIOS 211 to initialize and test hardware components coupled to IHS 200, and to load a host OS for use by IHS 200. Via the hardware abstraction layer provided by BIOS/UEFI 211, software stored in system memory 206 and executed by host processor(s) 201 can interface with I/O devices coupled to IHS 200.

Embedded Controller (EC) 212 (sometimes referred to as a Baseboard Management Controller or "BMC") includes a microcontroller unit or processing core dedicated to handling selected IHS operations not ordinarily handled by host processor(s) 201.

Examples of such operations may include, but are not limited to: power sequencing, power management, receiving and processing signals from a keyboard or touchpad, as well as other buttons and switches (e.g., power button, laptop lid switch, etc.), receiving and processing thermal measurements (e.g., performing cooling fan control, throttling CPUs and GPUs, controlling colling fan speeds, and emergency shutdown), controlling indicator Light-Emitting Diodes or "LEDs" (e.g., caps lock, scroll lock, num lock, battery, ac, power, wireless LAN, sleep, etc.), managing the battery charger and the battery, enabling remote or Out-of-Band (OOB) management, diagnostics, and remediation over network(s), and the like.

Unlike other devices in IHS 200, EC 212 may be made operational from the very start of each power reset, before other devices are fully running or powered on. As such, EC 212 may be responsible for interfacing with a power adapter to manage the power consumption of IHS 200. These operations may be utilized to determine the power status of IHS 200, such as whether IHS 200 is operating from battery power or is plugged into an AC power source. Firmware instructions utilized by EC 212 may be used to manage other core operations of IHS 200 (e.g., turbo modes, maximum operating clock frequencies of certain components, etc.).

In some cases, EC 212 may implement operations for detecting certain changes to the physical configuration or posture of IHS 200 and managing other devices in different configurations of IHS 200. For instance, when IHS 200 as a 2-in-1 laptop/tablet form factor, EC 212 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some implementations, EC 212 may be installed as a Trusted Execution Environment (TEE) component to the motherboard of IHS 200. Additionally, or alternatively, EC 212 may be further configured to calculate hashes or signatures that uniquely identify individual components of IHS 200. In such scenarios, EC 212 may calculate a hash value based on the configuration of a hardware and/or software component coupled to IHS 200. For instance, EC 212 may calculate a hash value based on all firmware and other code or settings stored in an onboard memory of a hardware component.

Hash values may be calculated as part of a trusted process of manufacturing IHS 200 and may be maintained in secure storage as a reference signature. EC 212 may later recalculate the hash value for a component may compare it against the reference hash value to determine if any modifications have been made to the component, thus indicating that the component has been compromised. As such, EC 212 may validate the integrity of hardware and software components installed in IHS 200.

In addition, EC 212 may provide an Out-of-Band communication channel that allows an Information Technology Decision Maker (ITDM) or Original Equipment Manufacturer (OEM) to manage IHS 200's various settings and configurations, for example, by issuing OOB commands.

In various embodiments, IHS 200 may be coupled to an external power source through an AC adapter, power brick, or the like. The AC adapter may be removably coupled to a battery charge controller to provide IHS 200 with a source of DC power provided by battery cells of a battery system in the form of a battery pack (e.g., a lithium ion or "Li-ion" battery pack, or a nickel metal hydride or "NiMH" battery pack including one or more rechargeable batteries).

Battery Management Unit (BMU) 213 may be coupled to EC 212 and it may include, for example, an Analog Front End (AFE), storage (e.g., non-volatile memory), and a microcontroller. In some cases, BMU 213 may be configured to collect and store information, and to provide that information to other IHS components.

Examples of information collectible by BMU 213 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information or state (e.g., such as ambient temperature, relative humidity, system geolocation measured by GPS or triangulation, time and date, etc.), events, etc.

In some embodiments, IHS 200 may not include all the components shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components shown in FIG. 2 (e.g., chipset 202, display controller(s) 204, communication interface(s) 203, EC 212, etc.) may be replaced by other devices. As such, IHS 200 may assume different form factors including, but not limited to: servers, workstations, desktops, laptops, appliances, video game consoles, tablets, smartphones, etc.

A multiport adapter 100, such as the device illustrated in FIGS. 1A-C, may be connected to IHS 200 using a USB port 207. The multiport adapter 100 provides connections to peripheral devices, such as an external monitor 214. The multiport adapter 100 may be connected to IHS 200 using a USB-C connector, and the monitor 214 may be connected to DisplayPort 104, USB-C port 105, an HDMI port 106, or VGA port 107 on multiport adapter 100. Additional peripheral devices, such as printers or scanners (not shown), may also be coupled to IHS 200 via multiport adapter 100. Multiport adapter 100 allowed IHS 200 to expand the number of available ports while adding a security feature that limits access to the additional ports. As described herein, the ports on multiport adapter 100 may be configured to require a fingerprint scan to activate. Biometric scanner 113 on multiport adapter 100 is used for fingerprint scanning in one embodiment. When multiport adapter 100 is connected to IHS 200, biometric scanner 113 may also be used by IHS 200 to authenticate a user for other purposes, such as to login to IHS 200 and/or to activate certain features or access levels of IHS 200.

System memory 206 may store a multiport adapter software application 215 that, when executed by host processor (s) 201, provides a user interface for configuring and using the multiport adapter 100. For example, the multiport adapter software application 215 may provide processes such as the fingerprint registration, adapter use, fingerprint deletion, and port enablement processes illustrated in FIGS. 4-7.

FIG. 3 is a circuit diagram 300 for a multiport adapter according to example embodiments. A main Integrated Circuit (IC) 301 is mounted on a circuit board 302. Main IC 301 has a number of pins or contacts that are coupled to the various adapter ports. These pins drive features of the secure-port adapter. Connections 303 couple groups of pins from main IC 301 to the various ports, such as USB, HDMI, VGA ports (101-107) on the multiport adapter 100. A group of twenty-four pins 304 (lines 0-23) provide a connection to a host laptop or similar device, such as through cable 108 and connector 109.

Pin 305 (line 24) is connected to LED light 306, which blinks in different colors according to current events on multiport adapter 100, such as registration, authentication, and login. Pins 307 (lines 25-28) are connected to a fingerprint sensor 308, which is used to take fingerprint scans of users. The main IC 301 uses pins 309 (lines 29-35) as ON/OFF pins that indicate whether a secure-port feature is enabled on the corresponding port or not. In the circuit diagram 300, pins 24, 25-28, and 29-35 are newly add pins compared to existing multiport adapters.

When the secure-port feature is enabled on a port (i.e., its corresponding ON/OFF pin will be in ON state), then the main IC 301 will wait for a user to authenticate before providing access to the secure port. When authentication is successful, the user will be able to use the port to communication with peripherals, for example. Otherwise, if authentication is not successful, then the port on adapter 100 is not available to the user. If the secure-port feature is disabled on a port (i.e., its corresponding ON/OFF pin will be in OFF state), then the main IC 301 will allow communication directly to/from the main IC 301 without asking for authentication. In a default configuration, the secure-port feature will be disabled on all the ports until configured by the user.

Fingerprint sensor 308 may be located on top of the multiport adapter in one embodiment, such as biometric fingerprint scanner 113 on top of multiport adapter 100 (FIG. 1A). The laptop or other device to which the multiport adapter is attached, such IHS 200 (FIG. 2), will require driver support for the secure-port feature as well as software to perform CRUD (create, read, update and delete) operations on the fingerprint for authentication and to enable/disable the secure ports.

In one embodiment, the user's fingerprint data will be stored in the attached device (i.e., laptop or IHS) in an encrypted file. In some configurations, there is no limit on the number of users who can register their fingerprint(s); however, based on a user's environment, they may restrict the use in the related software application.

The embodiments disclosed herein provide a secured plug-and-play mechanism. Ports on the multiport adapter will be secured from malicious events, such as a Man-In-The-Middle attack, because the user will not be able to use protected ports until authentication is complete. This mechanism provides hardware level blocking in which only authorized users can use peripherals attached via secured ports.

The fingerprint scanner on the multiport adapter can also be used by an attached IHS or laptop that has no fingerprint sensor. The multiport adapter's fingerprint scanner can be used for other authentication requirements, such as identifying the user in place of password credentials. This design allows a user to login into the device with fingerprint authentication thus avoiding a malicious actor from observing passwords or other credentials.

During operation, dedicated ON/OFF pins for each port determine whether the port is available based on the main IC driver code, which will decide whether to ask for authentication or directly allow the user to access a peripheral.

The main IC 301 may be, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the functions of the mail IC 301 may be provided by software, including firmware embedded on a device or processor, or software capable of operating a relevant environment of the IHS 200. The main IC 301 could also be a combination of any of the foregoing examples of hardware or software.

FIG. 4 is a flowchart illustrating a process 400 for registration of a fingerprint for use with a multiport adaptor having secure-port features. The process begins at 401 when a user wants to add a fingerprint to use with a multiport adapter. At 402, the user plugs the multiport adapter into an IHS, such as a laptop, and opens a secure-port software application on the IHS. At 403, the user selects an option to register fingerprints. The user may be prompted to scan his/her fingerprint(s) multiple times on the fingerprint scanner at different angles. This will allow the fingerprint scanner, such as scanner 113 on adapter 100 (FIG. 1A), to properly capture and identify the user's fingerprint(s) when the scanner on the adapter is touched from any position.

At 404, the secure-port application software determines whether the fingerprint scanning is completed. This determination may include evaluating whether a current fingerprint has been scanned a sufficient number of times and from enough a sufficient number of angles. Additionally, the application software may prompt the user to select a different finger for scanning or may query whether the user has entered as many fingerprints as desired. If additional scans are required (i.e., scanning not finished), the process moves to 405 to retry additional scans by circulating back to 403. Once the user has completed scanning all desired fingerprints, and the scanning is finished at 404, then the process ends at 406.

During the registration process 400, one or more lights (e.g., light 306) may be illuminated to indicate registration progress to the user. Such lights may illuminate in different colors and/or intensity to indicate whether additional fingerprint scans are required and how many scans are completed or required (e.g., the light may move from red to yellow to green and/or may increase intensity to indicate progress).

FIG. 5 is a flowchart illustrating a process 500 for use of a multiport adaptor having secure-port features. The process begins at 501 when a user wants to use a multiport adapter with ports that are secured with fingerprints. At 502, the user plugs the multiport adapter into an IHS, such as a laptop. At 503, a secure-port software application or driver on the IHS determines whether a secure-port feature is enabled on the multiport adapter. If the secure-port feature is not enabled, then at 504 the application determines that authentication is not required and communication begins between the IHS and any device coupled to ports on the multiport adapter. Any user may access the port when authentication is not needed at 504. Such communication continues until the device and/multiport adapter is disconnected and the process ends at 505.

At 503, if the secure-port feature is enabled, then at 506 the user scans a fingerprint on the multiport adapter's biometric scanner. The user may be prompted by application software to do this scanning or the system may wait for the user to place his/her finger on the biometric scanner. At 507, the captured fingerprint data is compared to stored fingerprint data to determine whether there was a match. The registered fingerprint data may be stored on the IHS/laptop in an encrypted file. If there is no match at 507, then authentication is noted as failed at 508 and a retry process begins. The port remains blocked at 508 until a valid authentication is achieved. The process returns to 506 to capture another fingerprint scan on the biometric scanner.

Once the scanned fingerprint matches the stored fingerprint at 507, then at 509 authentication is completed. The port will be unblocked and will operate like a normal port of its type (i.e., USB, VGA, HDMI, etc.). Communication will be allowed through the unlocked port between the IHS and the attached peripheral. Once communication is complete, such as the peripheral being removed or the multiport adapter being detached from the IHS, then the process ends at 505.

FIG. 6 is a flowchart illustrating a process 600 for removing fingerprints stored for a multiport adaptor having secure-port features. The process begins at 601 when a user wants to remove stored fingerprints associated with a multiport adaptor. At 602, the user logs into an IHS device to which the multiport adaptor is attached. and opens a secure-port software application on the IHS. The software application is password protected in one configuration to prevent accidental or malicious removal of fingerprints. At 603, the user selects a delete fingerprint option and selects one or more fingerprints to delete. The software application may query whether the user is sure that they want to delete fingerprints before moving forward. Upon confirmation, the fingerprints are deleted at 604, which may include, for example, deleting fingerprint data in an encrypted file stored on the IHS. The process then ends at 605 when selected fingerprint data is removed.

FIG. 7 is a flowchart illustrating a process 700 for enabling or disabling ports on a multiport adaptor having secure-port features. The process starts at 701 when a user wants to configure whether ports on the multiport adaptor should require fingerprints to activate. At 702, the user plugs the multiport adapter into an IHS, such as a laptop, and opens a secure-port software application on the IHS. At 703, the user selects a port configuration option. The software will present the user with options to enable or disable each port on the multiport adapter. For example, at 704 the user may have the option to click on a slider button on a user interface display to enable or disable each port individually. In other configurations, the software application may use other selection options to enable/disable the secure ports, such as radio buttons, check boxes, a dropdown menu, or the like. Once the user has selected the appropriate ports to be enabled or disabled for the secure-port feature, then the selections are saved at 705 and the process exits and ends at 706.

In an example commercial implementation, the multiport adapter 100 may be referred to as a Biometric-Secured Dell 7-in-1 USB-C Multiport Adapter. The multiport adapter 100 makes the use of its various ports (USB/LAN/HDMI) more secure by adding the biometric fingerprint scanner 113. This adds a new security layer to an existing plug and play feature thereby making the multiport adapter 100 ports more secure from malicious user attacks.

The fingerprint sensor 113 on top of the multiport adapter 100 allows for user authentication before using peripherals on the various multiport adapter 100 ports. Once authentication has been completed, the user will be able to use the peripheral as usual. To use this mechanism, the user enables the secure-port feature on the port(s) for which the user wants to enable authentication. The secure-port feature is controlled using password-secured software installed in the IHS device 200 to which the multiport adapter 100 is attached. Also, to make the user aware that the multiport adapter 100 is expecting a fingerprint scan, a small light, such as an LED light, is placed on, near, or around the fingerprint sensor 113. The light may be configured to flicker every time the user needs to authenticate a port. Once registration or login has finished, the LED will stop blinking to indicate that the user is using a peripheral.

To make the multiport adapter's main IC 301 aware that the user wants authentication or not, seven ON/OFF pins (one for each port) are included on the main IC 301. This helps the main IC 301 make decisions on whether to ask for authentication when peripherals are connected to the port. If the pin for a particular port indicates an OFF signal, then there is no need to ask for a user fingerprint scan. In this scenario, communication through the multiport adapter 100 operates as if the secure-port feature were not included (i.e., in the same manner as existing multiport adapters). If the pin for a particular port indicates an ON signal, then the user needs to scan his/her fingerprint and communication will start with the port once the authentication is successful. Otherwise, if authentication is not successful, then communication via the port is blocked by the main IC 301. FIG. 3 illustrates the circuit diagram depicting the ON/OFF pins, fingerprint sensor 113, and LED light connections.

Software will be required to perform operations on the fingerprint scans and to enable or disable the secure-port feature on each port. The driver code of the main IC 301 is modified so that the user can configure the secure-port feature. Every time before starting communication between a peripheral and the IHS device, the driver code will check the corresponding ON/OFF pin of the multiport adapter 100. Based on the ON/OFF pin value, the multiport adapter 100 will decide whether or not to ask for authentication via fingerprint scan.

The biometric fingerprint scanner 113 not only allows users to authenticate themselves while using the ports 101-107, but it can also be used to login to the attached IHS device 200 instead of typing a login password or pin every time the user wants to login.

The secure-port feature will generally be disabled by default on all the ports 101-107 of the multiport adapter. It is then up to the user to register as many fingerprints as he/she wants. To use a fingerprint for authentication, the user needs to register his/her fingerprint using configuration options in the multiport adapter software application 215. To register fingerprints, the user needs to launch the configuration software 215 on the IHS device 200 and select a register-fingerprint option. This will send metadata to the main IC 301 of the multiport adapter 100. The LED light 306 will then start blinking in blue, for example, indicating that the registration process is ongoing. The user then needs to scan his/her fingerprint multiple times to ensure 360° usage. The registration progress will be visible in the software's user interface, which may be presented to the user on a display device 205, for example. If the registration process is successful, then the LED 306 will start blinking green, indicating that the operation is successful. Once registration is complete, fingerprint data will be encrypted and saved in a file on the hard drive 208 of the attached IHS device 200 so that no one can tamper with it. The encrypted fingerprint data can then be accessed on the IHS device 200 whenever needed for authentication. An example flow diagram for a registration process is illustrated in FIG. 4.

To enable the secure-port feature, the user launch the configuration software 215 on the IHS device 200 and selects a port-configuration option. This will display a list of all the ports 101-107 present in the multiport adapter 100. The user then uses a slider button associated with each port 101-107 to enable the secure-port feature on that port. By default, the secure-port feature will be disabled on all the ports 101-107. Once the user enables the secure-port feature on a particular port, metadata will be sent to the main IC 301 of the multiport adapter 100, which will set the ON/OFF pin for that enable port to the ON state. This indicates that until reset this port is secured and, in order to use it, fingerprint authentication is required. An example flow diagram for enabling ports is illustrated in FIG. 7.

In an example use-case, the secure-port feature is enabled on a port 101-107, and the user has plugged in a peripheral (e.g., monitor 214). As soon as the user plugs in a peripheral 214, the driver code for the main IC 301 will check the state of the ON/OFF pin for that port. Since the secure-port feature has been enabled on that port, the associated pin will be set to the ON state. The main IC driver code will begin blinking the LED 306 white, for example, indicating that the port is secured and, to use it, a fingerprint is expected. The user then needs to scan his/her fingerprint using biometric scanner 113. The captured fingerprint data will go to the attached IHS device 200 via the main IC 301. The multiport adapter software application 215 will attempt to match the captured fingerprint data to the fingerprint data stored in an encrypted file. If the fingerprint data matches, then metadata indicating success will be sent to the main IC 301 from the IHS device 301, and the main IC driver code will blink the LED 306 in green for a few seconds indicating that authentication is successful. The multiport adapter will then start communication between the peripheral 214 and the IHS device 200. The user may then use the peripheral 214 without any security restrictions. If the fingerprint match fails, the LED 306 will blink red for a few seconds and then will again start blinking white to prompt the user to retry authentication. Using this authentication mechanism, the ports 101-107 are safe from malicious hardware attacks.

If the secure-port feature is disabled on a particular port and the user plugs in the peripheral, then the main IC 301 driver code will again check the state of the ON/OFF pin for that port, which will be in the OFF state this time. Thus, the main IC 301 will understand that the secure-port feature is disabled on the port, and the main IC 301 will allow communication between the peripheral and the IHS device 200 through the multiport adapter 100.

If a peripheral is already connected to the multiport adapter 100 and the user enables the secure-port feature on that port, then the IHS device 200 will send metadata to main IC 301 to enable the secure-port feature on that port. The main IC 301 driver code will set the ON/OFF pin for that particular port to the ON state, which will stop the ongoing communication, and the LED 306 will start blinking in white indicating authentication is needed to further use the peripheral on this port. Once the user provides a fingerprint as input and authentication is successful, the driver code will blink the LED 306 in green for a few seconds (indicating success) and start the communication again between the peripheral and the IHS device 200. If the authentication fails, then the LED 306 will blink in red for a few seconds and the multiport adapter 100 will continue to block communication on the port. An example flow diagram showing usage of the ports is illustrated in FIG. 5.

In one embodiment, the user can view logs to check who has tried to access the ports in his/her absence. The multiport adapter software application 215 may keep such logs showing use of the secure-port feature and scanning by the fingerprint reader 113. The user may delete existing fingerprint(s) from the database. An example flow diagram showing deletion of a fingerprint is illustrated in FIG. 6. Overall, this security mechanism not only safeguards the ports 101-107 at the hardware level but, at the same time, allows genuine users to access the ports 101-107 in a simple manner.

The key benefits that a user will get from the secure-port feature include:

- The ports are secure from Man-In-The-Middle attacks because the malicious user will be unable to use the ports until authentication is completed;
- The ports of current multiport adapters cannot be blocked via software because no such mechanism is present in existing devices. Any software that is present will permanently block the ports from being used until unblocked. On the other hand, the secure-port mechanism provides hardware-level blocking wherein only authorized users can use the peripheral via those secure ports; and
- The multiport adapter is a secure plug-and-play mechanism.

This solution is novel in over existing art in the following ways:

- A fingerprint sensor is attached to the multiport adapter for authentication and for securing various ports;
- The secure-port multiport adapter provides a mechanism that secures the various ports (USB/LAN/HDMI) from a malicious attack by blocking the ports at the hardware level and at the same time allows a genuine user to access peripherals in a plug-and-play manner;
- The design also allows a user to login to the attached IHS device with fingerprint authentication, thus avoiding password stealing via shoulder surfing;
- The major deciding factor for port access is a dedicated ON/OFF pin for each port. Based on the pin's value, the main IC driver code will make the decision whether to ask for authentication or to allow the user direct access to a peripheral;
- With the small addition of a fingerprint sensor and the ON/OFF pins, the multiport adapter not only safeguards the USB ports from malicious attacks, but also it blocks all the ports of the multiport adapter at the hardware level and keeps them secure from physical attack while maintaining the plug-and-play behavior of the multiport adapter; and
- The multiport adapter allows users to use the fingerprint sensor to login to the attached IHS device, a website, or another feature instead of typing a password, which avoids the risks associated with passwords, such as shoulder surfing, key logging, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A multiport adapter, comprising:

a housing;

a plurality of data ports positioned around the housing;

a fingerprint scanner on a surface of the housing; and a control circuit coupled to the plurality of data ports and to the fingerprint scanner, the control circuit configured to, in response to enablement of a secure-port feature, allow access to the one or more data ports of the plurality of data ports based upon authenticating a fingerprint scanned at the fingerprint scanner as matching stored fingerprint data;

wherein the control circuit is configured to, when the secure-port feature is not enabled, allow access to the one or more data ports of the plurality of data ports without requiring prior authentication of the fingerprint, and wherein the multiport adapter is configurable through an interface to individually enable and disable the secure-port feature on each of the plurality of data ports.

2. The multiport adapter of claim 1, further comprising:

a cable having a first end and a second end, the first end attached to the multiport adapter, and the second end configured to be attached to an Information Handling System (IHS).

3. The multiport adapter of claim 2, wherein the IHS is selected from the group consisting of: a laptop computer, a desktop computer, a server, and a tablet computer.

4. The multiport adapter of claim 2, further comprising:

a memory on the IHS, the memory configured to store encrypted fingerprint data.

5. The multiport adapter of claim 1, further comprising:

a light coupled to the control circuit, wherein the control circuit is configured to illuminate the light to indicate a current status of a port or an adapter configuration.

6. The multiport adapter of claim 1, wherein the control circuit is an integrated circuit (IC).

7. The multiport adapter of claim 1, wherein the data ports comprise one or more of a USB-A port, a USB-C port, a DisplayPort, an HDMI port, and a VGA port.

8. A multiport adapter, comprising:

an integrated circuit having a plurality of contact pins;

a plurality of ports mounted around a periphery of the multiport adapter, each of the plurality of ports coupled to data pins on the integrated circuit, and each of the plurality of ports further coupled to an on/off pin assigned to the port;

a cable having a connector on a first end, the connector configured to attach to a port on an information handling system, the cable having a second end electrically connected to selected contact pins on the integrated circuit;

a light coupled to a light pin on the integrated circuit; and a fingerprint sensor coupled to biometric sensor pins on the integrated circuit;

wherein the integrated circuit is configured to:

in response to enablement of a secure-port feature, allow access to one or more ports of the plurality of ports based upon authenticating a fingerprint scanned at the fingerprint sensor as matching stored fingerprint data; and when the secure-port feature is not enabled, allow access to the one or more ports of the plurality of ports without requiring prior authentication of the fingerprint; and wherein the multiport adapter is configurable through an interface to individually enable and disable the secure-port feature on each of the plurality of ports.

9. The multiport adapter of claim 8, wherein the integrated circuit is configured to pass signals between the cable and selected ones of the plurality of ports.

10. The multiport adapter of claim 9, wherein the integrated circuit is configured to allow the signals to pass from a selected one of the plurality of ports to the cable by setting a state on the on/off pin assigned to the port.

11. The multiport adapter of claim 8, further comprising:

a memory on the information handling system, the memory configured to store encrypted fingerprint data.

12. The multiport adapter of claim 9, wherein the signals are data signals exchanged between the information handling system and a peripheral attached to a data port on the multiport adapter.

13. The multiport adapter of claim 8, further comprising:

a processor on the information handling system, the processor configured to execute a software application that is adapted to collect user finger data and to enable or disable secure-port features on the multiport adapter.

14. The multiport adapter of claim 13, wherein the software application comprises computer-executable instructions stored thereon that, when executed by the one or more processors, cause the processor to:

display a fingerprint registration option;

capture multiple scans of a fingerprint using the fingerprint sensor; and store encrypted fingerprint data associated with the scanned fingerprint.

15. The multiport adapter of claim 13, wherein the software application comprises computer-executable instructions stored thereon that, when executed by the one or more processors, cause the processor to:

when a secure-port feature is enabled, scan a fingerprint on the fingerprint sensor;

compare scanned fingerprint data to stored fingerprint data; and when the scanned fingerprint data matches the stored fingerprint data, allow one or more ports on the multiport adapter to communicate with the information handling system.

16. The multiport adapter of claim 13, wherein the software application comprises computer-executable instructions stored thereon that, when executed by the one or more processors, cause the processor to:

display a port configuration option;

display a user interface associated with one or more of the ports; and receive a user selection to enable or disable one or more of the ports.

* * * * *